May 5, 1936.  G. T. WATT  2,039,695

CONTROLLING AND LUBRICATING MECHANISM

Filed Aug. 24, 1933  2 Sheets—Sheet 1

Inventor
George T. Watt
By Kenway + Witter
Attorneys

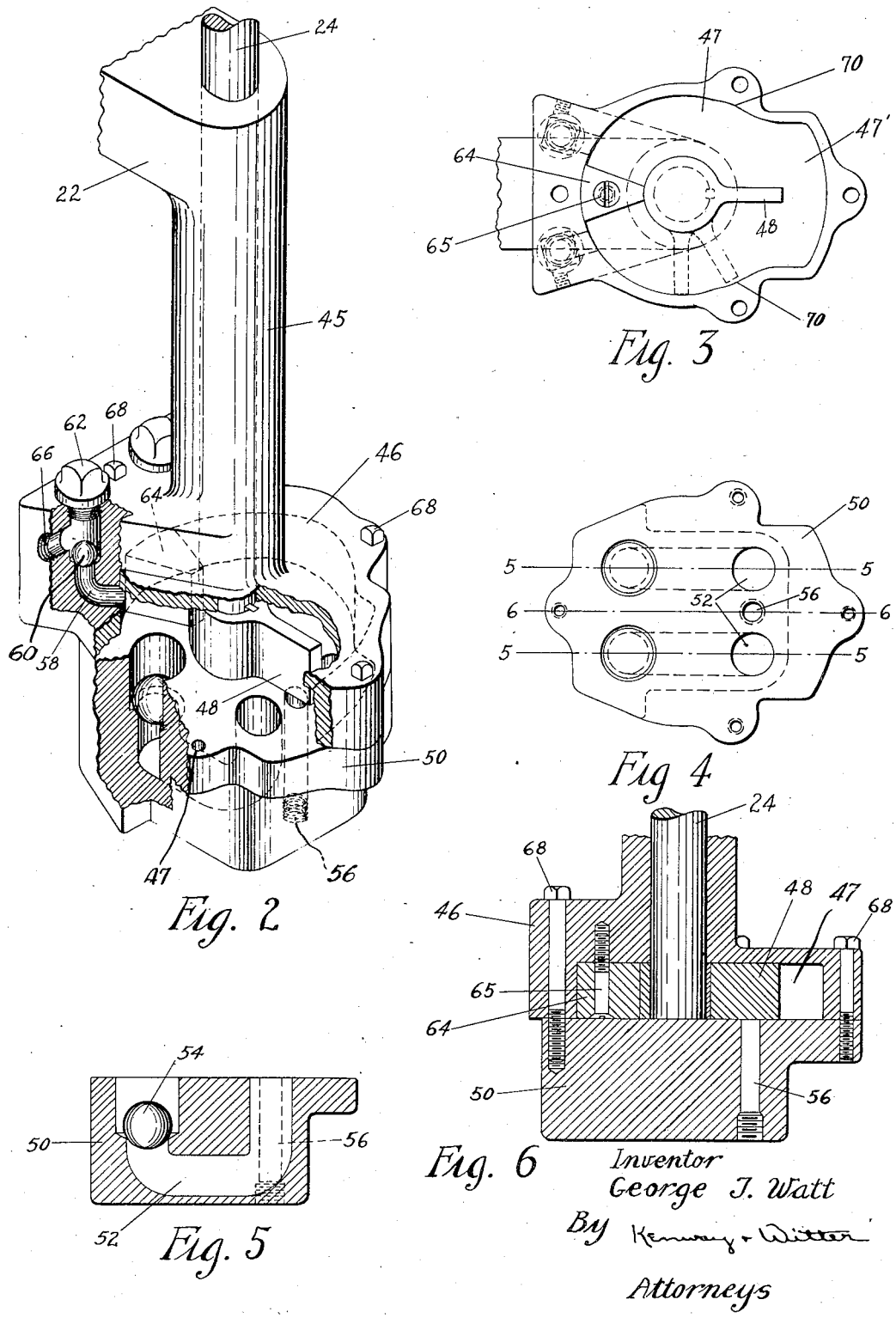

Patented May 5, 1936

2,039,695

UNITED STATES PATENT OFFICE 2,039,695

CONTROLLING AND LUBRICATING MECHANISM

George T. Watt, Bradford, Mass., assignor to Pope Machinery Corporation, Haverhill, Mass., a corporation of Massachusetts Application August 24, 1933, Serial No. 686,511

11 Claims. (Cl. 12—87)

This invention relates more particularly to improvements in machines for turning wood heels, but embodies a novel method and certain novel mechanism and improvements capable of more general and other applications. I shall, however, herein describe and illustrate the invention as embodied in a wood heel turning machine of the general type disclosed in United States Letters Patent No. 1,488,534, dated April 1, 1924. Machines of this type usually consist of a pair of vertical spindles carrying form cutters on their upper ends, suitably driven by motors or other power, and a work blank holder, commonly called a jack, mounted, by means of an intermediate crane or hinge, on a shaft between the spindles so as to permit swinging of the work holder and the presentation of a blank thereon to first one and then the other of the cutters.

The spindles are mounted in ball bearings and are rotated in very high speeds, thereby requiring constant and uniform lubrication of the bearings, too much oil causing the bearings to overheat and failure of the oil feed causing quick destruction of the bearings. Various attempts have been made to provide a suitable lubricating system for these spindles. Sight feed and wick feed oil cups have been used but have been found to be unsatisfactory and to some extent have been abandoned, the fact that occasionally an operator lets an oil cup run dry with resulting damage to the bearings being a very unfavorable factor. To obviate this danger, some manufacturers have fitted centrifugal pumps to the spindles, immediately below the lower bearings, to pump oil to the upper bearings, after which the oil flows down through the upper and lower bearings and is again pumped up to the top and so kept in circulation. This system is objectionable for various reasons. The necessarily high speed of the pump impeller requires considerable power and causes foaming or frothing of the oil, making it difficult to force up through a pipe to the upper bearing so that, as a measure of safety, a much larger quantity of oil per unit of time is pumped through the bearings than is desirable, thus causing tendency to overheat. Also the mechanical limitations are such that only a few ounces of oil can be used, resulting in early pollution of the oil and requiring frequent refilling. Furthermore, the frequent fillings are bound to cause a contamination of the oil, as dust and shavings are always an accompaniment of wood working.

One object of my invention is the production of a lubrication system, especially adapted to these machines, that will furnish a constant and uniform supply of cooled and filtered oil in proper quantities for best results to each bearing and require no attention from the operator other than refilling three or four times per year.

Another and related feature of the invention concerns a novel mechanism for regulating the speed of initial engagement of the work blank with the cutter, this mechanism acting to eliminate the major source of loss through breakage which, in the turning of wood heels, has been from the splintering or tearing out of the sides of the heel blanks due to excessive speed of initial engagement of the blank with the cutter. In accordance with the invention, I utilize a dashpot for this purpose and furthermore utilize the dashpot as a pump for the purpose of providing oil to the spindles as above specified. It is essential that the work holder shall be substantially free to move away from the cutters but should encounter a proper and smooth resistance in the opposite direction whereby to permit only such initial engagement of the work with the cutters as will serve the purpose without danger of splitting the heel. The dashpot is particularly suited to perform these functions with efficiency, and is likewise well adapted also to furnish the lubricating motive force in the said lubricating operations, all as hereinafter described.

It will be understood that one function of the dashpot herein is to provide resistance limiting the initial engagement of the work with the cutter to the correct and safe speed and I utilize the pressure created incidental to this action to pump oil from the dashpot to a point lubricating the spindle bearings, the dashpot thus also serves as a lubricant pump. My improved lubricating system furthermore preferably includes an oil cup above the bearings and a storage tank below the bearings whereby to provide a constant flow of clean oil to the bearings and permit the oil draining from the bearings to collect in the tank and cool before again being circulated. The invention furthermore includes certain other novel features of construction and operation hereinafter described.

These and other features of the invention will be best understood and appreciated from the following description of a preferred embodiment thereof, selected for purposes of illustration and shown in the accompanying drawings, in which Fig. 1 is an isometric view of a wood heel turning machine embodying my invention.

Fig. 2 is an enlarged detail view of the oil pump, partially broken away.

Fig. 3 is a bottom plan view of the pump body, the cover 50 being removed (see Fig. 4).

Fig. 4 is a top plan view of the pump cover.

Fig. 5 is a cross section taken on line 5—5 of Fig. 4, and

Fig. 6 is a fragmentary sectional view taken on line 6—6 of Fig. 4.

Figure 1:
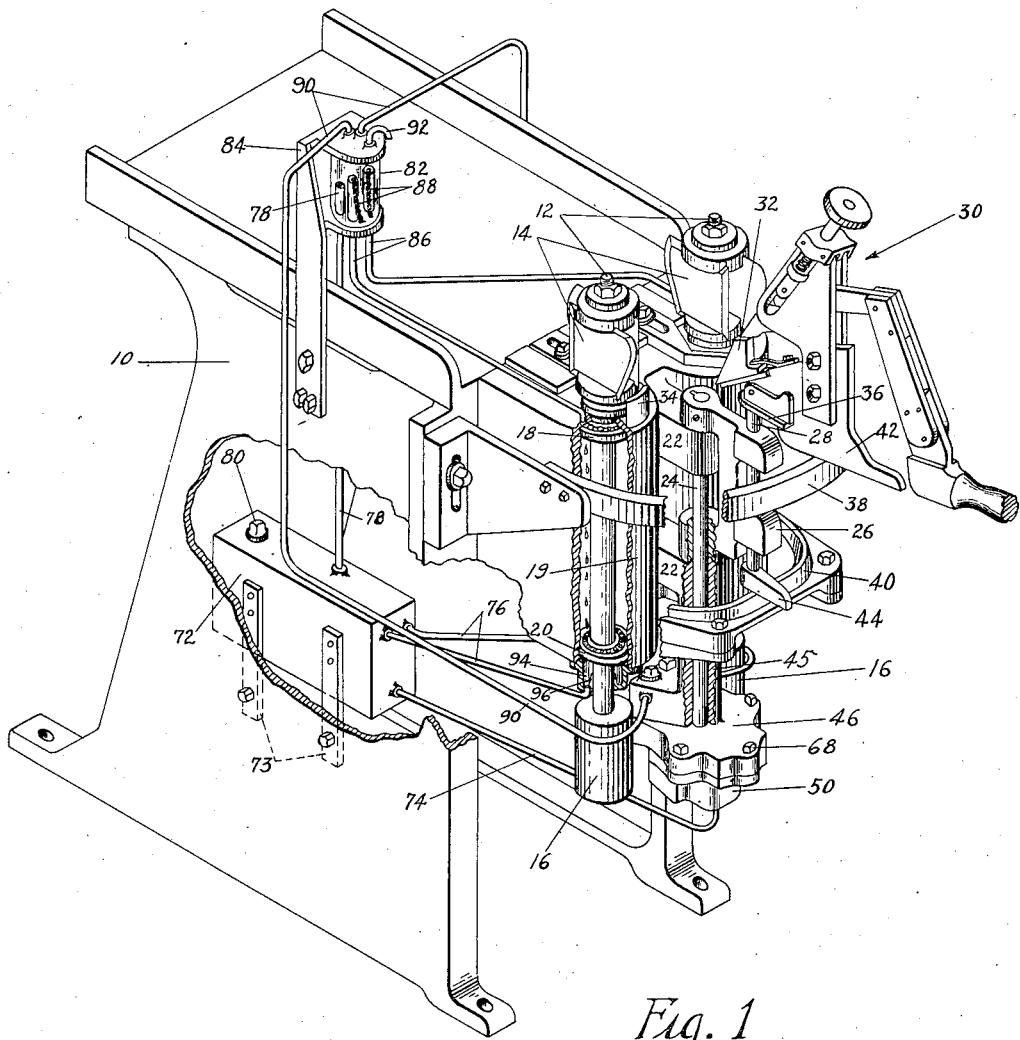

The wood heel machine illustrated in the drawings comprises a frame 10 having two cutter spindles 12 mounted vertically therein and having form cutters 14 and pulleys 16 mounted on the ends thereof, the spindles being carried on upper and lower ball bearings 18 and 20. Also carried by the frame intermediate the spindles are bosses 22 supporting the vertical crane shaft 24 carrying the crane 26 in which is mounted a vertical jack shaft 28 on which is pivotally mounted a work holding jack 30. The construction and operation of the jack are well known and need not, therefore, be specifically described herein, it being sufficient to state that the jack is adapted to support a heel blank 32 which is engaged with either of the cutters by swinging the jack about the axis of crane shaft 24. This movement of the jack toward the cutters is limited by adjustable collars or stops 34 engaged by cam plate 36 carried by the jack.

The movements of the jack in the cutting operation are controlled by the cam plate 36 and by upper and lower tracks 38 and 40, supported on and extending about the frame. Briefly the upper track controls the tilting of the heel blank through the agency of a rider 42 on the track 38, and the lower track controls the elevation of the heel blank through the agency of a rider 44 and other connections including jack shaft 28, the rider 44 engaging lower track 40, all of which is well known in machines of this type.

As has been heretofore stated, the cutter spindles 12 are rotated at relatively high speeds and one novel feature of my invention is the provision of improved means assuring adequate and proper lubrication of the spindle bearings 18 and 20 at all times. This lubricating function requires the use of a pump for raising the lubricant to the upper bearings and, in accordance with the invention, I actuate this pump through movement of the jack 30, whereby the pump may be further utilized to serve the purpose of a dashpot controlling the movement of the work into the cutters for reasons heretofore stated. I shall now proceed to describe the specific pump arrangement illustrated in the drawings.

The pump or dashpot comprises a housing 46 carried on the frame 10 at the lower end of crane shaft 24 and into which the shaft extends, and the housing may include a tubular portion 45 integral with the lower boss 22. Within the housing is an operating chamber 47 closed by a cover member 50 secured by means of bolts 68 to the bottom face thereof. The crane shaft 24 extends into this chamber and has fixed thereto a vane or piston 48 moving with the shaft in either direction from the mid-position of the parts as shown in Figs. 1, 2, 3 and 5. The chamber has a laterally extending portion 47' on the side thereof corresponding to the mid-portion of the vane 48, as illustrated in Fig. 3, and a block 64, held in place by screw 65, fills and closes the chamber at the opposite side of the shaft. The shaft is substantially free to rotate when the vane is in the chamber portion 47' but the movement thereof in either direction toward the block 64 is restricted and the oil trapped between the vane and block is compressed when the vane passes into the main portion of the chamber 47, the restriction to movement of the vane toward the block 64 increasing as the vane passes through the eccentric portions 70 of the chamber, as and for the purpose hereinafter described. Relief ports 52 are provided through the member 50 at the opposite sides of the shaft 24 and a ball check valve 54 is located at the end of each port adjacent to the block 64. The valves prevent flow of oil through the ports when the vane is moving toward the block 64 but permit free flow therethrough when the vane is moving in the opposite direction, thus permitting free movement of the work holder away from the cutters.

Oil is supplied to the pump chamber from a tank 72 mounted within the frame 10, as by brackets 73, the bottom of the tank being higher than the pump housing so that the oil will flow by gravity to the pump through a pipe 74 in communication with the duct 56 through the cover 50. Thus the pump chamber is kept filled with oil from the tank, the tank being adapted to be refilled through an opening normally closed by a threaded plug 80. A portion of the oil trapped between the vane 48 and block 64 at each stroke of the vane is permitted to escape through one of the two ports 58 each provided with a ball check valve 60 for preventing return flow of the oil, removable screw caps 62 providing access to the valves. Pipes 90 are in communication with the ports 58 and are arranged to carry the discharge oil therefrom to an oil cup 82 located well above the spindle bearings 18 and 20. The oil cup may be mounted in any convenient manner, as by a bracket 84.

Oil is delivered from the cup 82 to the upper bearings 18 by means of pipes 86. It is desirable that this flow of oil shall be relatively slow and continuous and I, therefore, prefer to use a wick feed arrangement in this part of the system. To this end, wicks 88 are provided in the cup ends of the pipes whereby oil can pass into the pipes by capillary action only, thus not only assuring a slow uniform and steady flow of oil but also assuring a flow of filtered oil only to the bearings. The level of oil in the cup is kept constant by means of an overflow pipe 78 leading to the tank 72 and a vent tube 92 is provided through the top wall of the cup, this tube being suitably packed with filtering gauze or felt to insure that no dust or dirt can pass therethrough into the system.

The lower bearings 20 are lubricated by the oil draining thereinto from the upper bearings 18, tubular housings 19 surrounding the spindles 12 between the bearings and preventing any exposure of the oil. An annular collection chamber or pocket 94 is provided beneath each bearing 20, the inner tapered wall of such chamber being closely adjacent to the spindle and directing the oil outwardly away from the spindle and into the chamber. Pipes 76 connect the bottoms of the pockets 94 with the top of the tank whereby to drain the oil back into the tank, the tank being sufficiently low to insure that oil will not overflow the top ends of the walls 96 even if the tank is full.

It will now be apparent that my invention embodies a frame 10 supporting two relatively movable members, i. e., the work holder or jack 30 and the cutters 14, the work holder or jack 30 being movable relative to the cutters 14 and being connected to and operating the vane 48 of the shock absorber, whereby the shock absorber serves to check movement of the work holder toward the cutters and whereby such checking operation produces oil pressure within the pump chamber. The piping shown in the drawings serves to conduct oil from the chamber to the bearings of the cutter spindles.

The operation of the mechanism illustrated and above described is briefly as follows:

A heel blank 32 is clamped in the work holding jack 30 in the mid-position of Fig. 1. The jack is then swung in one direction or the other about the axis of the crane shaft 24 to bring the heel into engagement with one or the other of the cutters. It is desirable to permit relatively free and rapid movement of the parts until the work approaches the cutter and then to restrict the movement to such speed as will permit engaging of the work with the cutter without danger of splintering the work.

It will be understood that the several parts of the machine are so relatively positioned that the blank engages the cutter considerably in advance of the engagement of the cam plate 36 with the stop 34 and that the blank is fed directly and bodily into the cutter. Fast production requires that the blank be swung at high speed first to one cutter and then back across the machine to the other cutter. Prior to this invention it has been the operator's duty to try to check this fast approach at the instant the blank touches the cutter and thereafter steady the feeding movement through the primary cut, that is, until the cam plate 36 contacts the stop 34. This requires a high degree of skill and attention and the expenditure of much energy, and even with this skill and effort the blanks are frequently splintered and destroyed.

In addition to this poor speed control, the primary cut under such conditions is violent in nature, being contrary to approved wood cutting practice in that the blank is fed bodily toward the center of the cutter instead of progressively past the cutter as occurs in the subsequent cutting of the blank after the cam plate 36 has come into contact with the stop 34 which thereafter positively controls the position of the crane and thereby prevents any sudden or uncontrolled movements of the blank toward the center of the cutter.

It is the speed of feed of this deep, violent and poorly controlled primary cut prior to the meeting of the cam plate and the adjustable stop that the dashpot feature of this invention is designed to check or control. This control begins just before the blank reaches the cutter and ends as soon as the jack has received the added control of the cam plate riding against the adjustable stop. As a feed speed control through the primary cut the oil dashpot is ideal, it being possible by this device, knowing the approximate speed of approach, to secure within satisfactory limits any desired speed of feed by varying the oil leakage.

By reference to Fig. 3, it will be apparent that the portion 47' of the pump chamber permits free rotation of the vane 48 until the vane approaches the eccentric portion 70 of the chamber wall which position corresponds with the approach of the work to the cutter. At this position, flow of oil around the vane is restricted by the wall 70 and thus continued movement of the vane is limited to a slower speed. The eccentric wall continues further to check the speed in such manner that the actual initial engaging of the work with the cutter is a relatively smooth and gradual operation. When the cam plate 36 engages the stop 34, the work is fully engaged with the cutter and the vane is in the extreme position indicated by broken lines in Fig. 3. The turning of the heel is thereafter performed by rotating the jack and heel about the axis of shaft 28.

It will be seen that the pump or dashpot permits rapid movement of the work to either cutter, automatically limits the speed of such movement as the work approaches the cutter, and finally causes an easing of the work into proper initial engagement with the cutter. Thus the mechanism insures the proper speed of initial engagement of the blank with the cutter regardless of the skill, experience or disposition of the operator, and furthermore eliminates the necessity for great care which the operator has heretofore been required to exercise.

During the working stroke of the vane or piston 48 toward the block 64, a portion of the oil trapped therebetween is forced outwardly past the valve 60 and into the pipe 90 leading to the oil cup 82. This pipe is of such size as to furnish a surplus of oil to the cup 82 but not large enough greatly to reduce the pressure created by the movement of the vane 48. As far as the desired dash pot action is concerned, oil pipe 90 simply furnishes part of the oil leakage or relief necessary to secure the desired speed of blank to cutter engagement, the balance of the necessary leakage being provided by clearance between the end of vane 48 and the pump housing, as shown at 70 in Fig. 3. This clearance leakage can be uniform, graduated, or adjustably controlled without departing from the scope of this invention, although I prefer gradually to vary the same by the eccentric wall 70. The ports 52 permit free return movement of the vane as will be understood.

The oil in the member 46 and the pressure thereof, incidental to the use of the member as a dashpot, are thus utilized in lubricating the spindle bearings. The tank 72 may have a capacity of two or three gallons and the pump chamber 47—47' is kept filled therefrom by gravity. A few oscillations of the work holder 30 serve to fill the oil cup 82, after which no further attention is required in the ordinary operation of the machine, except to re-fill the tank three or four times per year as required.

The usual operation of the work holder provides a surplus of oil to the cup 82 and the overflow pipe 78 acts to maintain the proper level in the cup. No oil can enter the upper bearing feeder pipes 86 except through the wicks 88 by capillary action. By this means the desired small quantity of filtered oil is constantly fed to the top bearings 18. After working down through and lubricating top bearing 18 the oil drops down through the spindle housing 19 to and through the lower bearing 20, after which it is caught in the annular pocket space 94 and then returned by gravity to the tank through pipes 76 for cooling and storage. The pumping of the oil, being purely incidental and therefore without expense, is arranged to furnish a considerable surplus of oil to cup 82, thereby assisting by its passage through the piping in keeping the supply of oil cool and the bearings well and properly lubricated.

The cup 82 is of sufficient capacity to furnish oil to the bearings for many hours after pumping ceases. This provides the proper lubrication of the bearings for starting up the machine after being shut down over night or even for two or three days. The turning of a few heels quickly re-fills the cup to its full level.

It will now be apparent that my invention embodies the use of an oil pumping member for the purpose of serving two important functions, one function being the use of the member as a dashpot in checking the movement of an element, as the work holder 30, and the other function utilizes the incidental pressure in the dashpot for lubricating purposes, as the lubricating of the spindle bearings 18 and 20. The heel turning machine illustrated and described herein is obviously greatly improved by the application of my invention thereto, the invention being particularly applicable to such a machine but not limited thereto since it is capable of various other applications.

Having thus described my invention, what I claim as new and desire to secure by Letters Patent is:

1. In a machine of the class described, a spindle having a tool thereon, a work holder movably mounted to bring a work blank thereon into engagement with the tool, and means including a pump actuated by movement of the work holder for providing oil to the spindle bearings and simultaneously checking the speed of initial engagement of the blank with the tool.

2. In a machine of the class described, a spindle having a tool thereon, a shaft, a work holder connected to the shaft and pivotally movable thereabout toward and from the tool, and means including a pump having a vane fixed to the shaft and movable about the longitudinal axis thereof for providing oil to the spindle bearings upon said pivotal movement of the work holder.

3. In a machine of the class described, a cutter spindle, bearings rotatably supporting the spindle, a work holder movable relative to and cooperating with the spindle, an oil cup above the bearings, an oil tank below the bearings, an oil pump actuated by movement of the work holder to force oil from the pump, a conduit for conducting such oil to the cup, and conduits for conducting oil from the cup to the bearings and from thence back to the tank.

4. The machine defined in claim 3 in which movement of the work holder toward the spindle provides said actuation of the pump and serves simultaneously therewith to check the approach of the work holder to the spindle.

5. In a machine of the class described, a cutter spindle, a work holder movable toward and from the spindle, a lubricant dashpot, means providing a connection between the dashpot and work holder whereby said movement of the latter is checked by the former, and means including piping in communication with the pressure chamber in the dashpot for conducting the lubricant under pressure therein to the spindle.

6. In a machine of the class described, a spindle having a tool thereon, a work holder movably mounted to bring a work blank thereon into engagement with the tool, means including an oil pump actuated by movement of the work holder to force oil from the pump as the blank approaches the tool, means within the pump for increasing the resistance to work holder movement as the blank approaches the tool, and piping for conducting said oil from the pump to the spindle bearings.

7. In a machine of the class described, a spindle having a tool thereon, a work holder movably mounted to bring a work blank thereon into engagement with the tool, means including an oil pump actuated by movement of the work holder to force oil from the pump as the blank approaches the tool, means including piping for conducting such oil through the spindle bearings, and means within the pump for increasing the resistance to work holder movement as the blank approaches the tool.

8. In a machine of the class described, a spindle, a member movable toward and from the spindle, a lubricant dashpot, means providing a connection between the dashpot and member whereby said movement of the latter toward the spindle is checked by the former, means including piping in communication with the pressure chamber in the dashpot for conducting the lubricant under pressure therein to the spindle, and means including piping and a reservoir for conducting the lubricant from the spindle back to said chamber, said reservoir being adapted to store a supply of lubricant and being so located as to collect and cool the returning lubricant before passing the same on to the chamber.

9. In combination, a mechanism including a work holding member and a member for operating on work carried thereby, an oil type shock absorber having an oil chamber therein, an operative connection between the shock absorber and one of the members whereby the former is operated by and serves to check movement of the latter toward the other member, said checking operation producing oil pressure within said chamber, and means for conducting oil from said chamber to said mechanism and from said mechanism back to the chamber.

10. In combination, a rotary spindle, bearings rotatably supporting the spindle, a tool on the spindle, a work holder movable relative to the tool, an oil type shock absorber having an oil chamber therein, an operative connection between the shock absorber and the work holder whereby the former is operated by and serves to check movement of the latter toward the tool, said checking operation producing oil pressure within said chamber, and means for conducting oil from said chamber to said bearings.

11. In combination, a mechanism including a member mounted on a supporting frame and movable relative thereto through a predetermined path, an oil type shock absorber mounted on the frame and having an oil chamber therein, an operative connection between the shock absorber and the movable member whereby the shock absorber is operated by and serves to check movement of the movable member relative to the frame at a predetermined portion only of said path, said checking operation producing oil pressure within the oil chamber, and means for conducting oil from said chamber to said mechanism.

GEORGE T. WATT.